Figure 1:
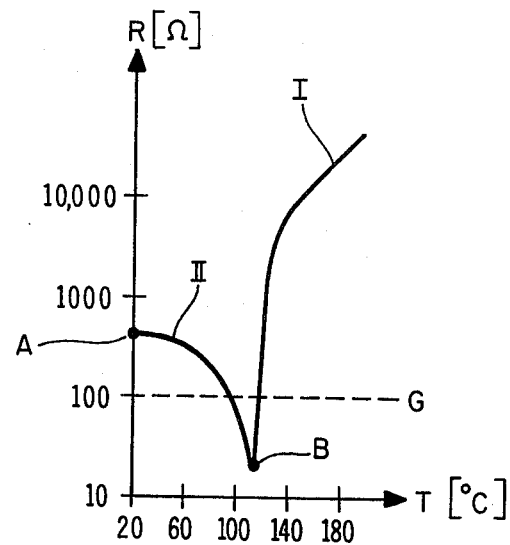

United States Patent [19]

Gramkow

[11] 4,052,650
[45] Oct. 4, 1977

[54] STARTING DEVICE FOR A SINGLE-PHASE MOTOR

[75] Inventor: Asger Gramkow, Gammelgard, Denmark

[73] Assignee: Danfoss A/S, Nordborg, Denmark

[21] Appl. No.: 416,527

[22] Filed: Nov. 16, 1973

Related U.S. Application Data

[63] Continuation of Ser. No. 275,159, July 26, 1972.

[51] Int. Cl.² .............................................. H02P 1/44
[52] U.S. Cl. ................................ 318/221 H; 318/229
[58] Field of Search ........... 318/221 R, 221 B, 221 C, 318/221 E, 221 H, 229

[56] References Cited
FOREIGN PATENT DOCUMENTS 1,042,126    9/1966    United Kingdom ............ 318/221 R

*Primary Examiner*—Gene Z. Rubinson

[57] ABSTRACT

The invention relates to a single-phase motor assembly which includes in the circuit means thereof a starting winding in series with a starting resistor having NTC and PTC characteristics. The NTC and PTC characteristics are sequentially related. The NTC characteristic has an ohmic range which extends from a value above to a value below a predetermined critical ohm value at which a current sufficient for starting the motor flow in the starting winding. The PTC characteristic has an ohm range which extends from a value below to a value above the critical ohmic value referred to.

3 Claims, 2 Drawing Figures

STARTING DEVICE FOR A SINGLE-PHASE MOTOR

This is a x Continuation, of appln. Ser. No. 275,159, filed July 26, 1972.

This invention relates to a starting device for a single-phase motor comprising a starting winding and a main winding, the starting device being equipped with a starting resistance with a substantially positive temperature coefficient (PTC resistor) in the starting circuit and applicable in particular to a thermostatically controlled motor forming part of an enclosed small refrigerating unit.

It is known to substitute a PTC resistor for the starting switch of a single-phase motor, the resistor being dismensioned such that, at the instant of connection, its resistance is so small that a current sufficient for starting the motor passes through the starting winding, the resistance value being raised as a result of heating to such a degree that, in operation, only a very small amount of current flows through the starting circuit. It has also been suggested to include in the PTC resistor characteristic a substantially horizontal branch at the beginning which commences to rise steeply only after the ambient temperature has reached the maximum value to be anticipated. In this way, the effect of the ambient temperature is compensated. In this context, it was further proposed to impart to the horizontal branch of the characteristic slight NTC properties, in order to compensate for the slight increase of resistance due to heating in the starting winding.

The current flowing when a single-phase motor is switched on is very high. It is composed of the short-circuit current of the main winding and the full current of the starting winding. This constitutes a very high load on the switch. The latter has to be dimensioned accordingly. This is not only expensive, but in the case of automatically actuated switches, for example thermostat switches, leads to difficulties. Furthermore, the switching of a heavy current produces a sudden voltage drop in the associated installation which may cause the lighting to flicker for example. The present invention has for its object to obviate these disadvantages.

According to the invention this is done in that the PTC branch of the characteristic of the starting resistor is preceded by a branch with pronounced NTC properties, this NTC branch beginning above and finishing below a critical resistance value which allows a current sufficient for the starting of the motor to flow in the starting winding.

Under these conditions, the switch substantially needs to cope only with the current of the main winding. The current in the starting circuit is at first small but rises quickly because of the NTC properties of the resistor, so that it attains the level needed for starting after a short delay. Thus, at the moment of switching, the switch is loaded less heavily. The switch can be produced far more cheaply even when the current at the moment of switching is only 20% less than hitherto. Moreover, the effect which the switching operation has on the rest of the installation is much smaller because only a part of the current is switched instantaneously, while the remainder of the current is applied gradually.

In the case of a starting resistor of preferred characteristics the resistance falls at first by about one order of magnitude, as a result of heating. For example, the resistor has a value of 400 ohms at room temperature, drops to 25 ohms at about 100° C and then rises very steeply to 3000 ohms and above.

A starting resistor of the type referred to above is disclosed in (1) U.S. Pat. No. 2,976,505 to Yoshio Ichikawa for THERMISTORS, issued Mar. 21, 1961, (2) British Pat. No. 714,965 for Improvements in or relating to Semi-Conductive Material, published Sept. 8, 1954, and (3) an article titled "Semiconducting Bodies in the Family of Barium Titanates" in the Journal of the American Ceramic Society (Vol. 44, No. 2) by Osamu Saburi.

The invention will now be described in further detail with reference to the drawings.

Figure 2:
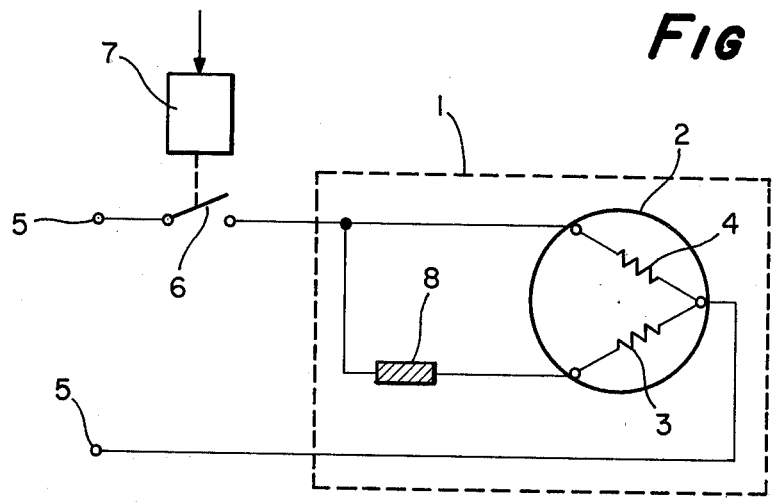

FIG. 1 shows the resistance/temperature diagram of a PTC resistor applicable according to the invention and FIG. 2 shows an embodiment of the invention in diagrammatic representation.

In FIG. 2 a motor 2 is housed in an hermetically closed case 1, the motor comprising a starting winding 3 and a main winding 4. The motor is connected across mains terminal 5 and is switched on the via the contact 6 of an evaporator thermostat 7. In the starting winding is included a temperature-dependent starting resistor 8.

The starting resistor 8 has the resistance/temperature characteristic illustrated in FIG. 1. In this characteristic, a PTC branch I is preceded by an NTC branch II. The latter has the value A at room temperature, this value being above the critical level G at which the current in the starting winding is sufficiently high to allow the motor 2 to start. As the starting resistor 8 is increasingly heated, in particular by the current passing through it, the resistance drops until the turning point B is reached. Up to this point, the resistance remains below the critical level G, so that the motor is allowed to start. Thus, when the contact 6 is made, only a small current flows in the starting winding, in addition to the full current of the main winding; the current in the starting winding only begins to rise to full value during the time interval immediately following the switching operation. Thereafter it drops in the usual manner to a negliblity small value.

I claim:

1. A single-phase motor assembly including circuit means, a first branch of said circuit means containing a main winding, a second brance of said circuit means in parallel with said first branch containing winding means for starting and a starting resistor, said resistor having sequential NTC and PTC characteristics, said NTC characteristic having an ohmic range which extends from a first value above to a second value below a predetermined critical ohmic value at which a current sufficient for starting the motor flows in said starting winding means, said first value being on the order of approximately ten times said second value and being at least several times said critical value, said PTC characteristic having an ohmic range which extends from a value below to a value above said critical ohmic value.

2. A single-phase motor assembly according to claim 1 wherein said NTC range is from about 400 ohms to 25 ohms and said PTC range is from about 25 ohms to about 3000 ohms and above.

3. A single-phase motor according to claim 1 wherein said NTC range corresponds to an approximate temperature range from 20° C. to 115° C. and said PTC range corresponds to an approximate temperature range from 115° C. to 200° C. and above.

* * * * *